(12) United States Patent
Yamashita et al.

(10) Patent No.: US 8,702,121 B2
(45) Date of Patent: Apr. 22, 2014

(54) AIRBAG DEVICE

(75) Inventors: Satoshi Yamashita, Settsu (JP); Hiroshi Kobayashi, Settsu (JP); Tadaaki Sekino, Settsu (JP)

(73) Assignee: Ashimori Industry Co., Ltd., Osaka (JP)

( * ) Notice: Subject to any disclaimer, the term of this patent is extended or adjusted under 35 U.S.C. 154(b) by 0 days.

(21) Appl. No.: 13/697,418

(22) PCT Filed: May 10, 2011

(86) PCT No.: PCT/JP2011/060735
§ 371 (c)(1),
(2), (4) Date: Nov. 12, 2012

(87) PCT Pub. No.: WO2011/142347
PCT Pub. Date: Nov. 17, 2011

(65) Prior Publication Data
US 2013/0056964 A1 Mar. 7, 2013

(30) Foreign Application Priority Data
May 14, 2010 (JP) ................................ 2010-112130

(51) Int. Cl.
*B60R 21/207* (2006.01)
(52) U.S. Cl.
USPC .................... 280/730.1; 297/216.1
(58) Field of Classification Search
USPC ............... 180/274, 282; 280/730.1, 740, 742, 280/743.1; 297/216.1
IPC ...................................................... B60R 21/207
See application file for complete search history.

(56) References Cited

U.S. PATENT DOCUMENTS

| | | | | |
|---|---|---|---|---|
| 6,715,788 B2 * | 4/2004 | Saiguchi et al. | ........... | 280/730.1 |
| 6,935,684 B2 * | 8/2005 | Sakai | ........... | 297/216.1 |
| 7,032,926 B2 * | 4/2006 | Ruel | ........... | 280/743.1 |
| 7,306,257 B2 * | 12/2007 | Yoshikawa et al. | ........ | 280/728.2 |
| 7,527,333 B2 * | 5/2009 | Suzuki et al. | ........... | 297/216.1 |
| 7,549,674 B2 * | 6/2009 | Yoshikawa et al. | ........... | 280/740 |
| 7,878,589 B2 * | 2/2011 | Murakami et al. | ........ | 297/284.11 |
| 8,297,650 B2 * | 10/2012 | Enders | ....................... | 280/730.1 |
| 2006/0017266 A1 * | 1/2006 | Yoshikawa et al. | ........ | 280/730.1 |

(Continued)

FOREIGN PATENT DOCUMENTS

| | | | | |
|---|---|---|---|---|
| EP | 1623887 A2 * | 2/2006 | ............ | B60R 21/207 |
| EP | 1 767 396 A1 | 3/2007 | | |

(Continued)

*Primary Examiner* — Faye M Fleming
*Assistant Examiner* — Laura Freedman
(74) *Attorney, Agent, or Firm* — Sughrue Mion, PLLC

(57) ABSTRACT

In an airbag inflatable inside a seating portion of a vehicle's seat, the design flexibility, in terms of shape and height, of the airbag in an inflated state is increased. An airbag device (1) includes an airbag (10) and an inflator (2). The airbag (10) is disposed inside a seating portion of a seat and is inflated under a seated occupant. The inflator (2) generates gas to inflate and deploy the airbag (10). The airbag (10) includes an upper base fabric piece (11), a lower base fabric piece (12), and a pair of side base fabric pieces (13), which are joined to one another and form an air chamber (14) therein. The pair of side base fabric pieces (13) are disposed at part of side portions between the upper base fabric piece (11) and the lower base fabric piece (12) and define the shape of the air chamber (14) in an inflated state.

6 Claims, 5 Drawing Sheets

(56) References Cited

U.S. PATENT DOCUMENTS

| | | | |
|---|---|---|---|
| 2006/0196715 A1* | 9/2006 | Fujishiro et al. | 180/271 |
| 2007/0132214 A1* | 6/2007 | Suzuki et al. | 280/730.1 |
| 2008/0088119 A1* | 4/2008 | Murakami | 280/730.1 |
| 2009/0045606 A1* | 2/2009 | Yoshikawa et al. | 280/728.2 |

FOREIGN PATENT DOCUMENTS

| | | | | |
|---|---|---|---|---|
| EP | 2022685 A2 * | 2/2009 | | B60R 21/207 |
| JP | 07228213 A * | 8/1995 | | B60R 21/20 |
| JP | 2002-079861 | 3/2002 | | |
| JP | 2002-079862 | 3/2002 | | |
| JP | 2002079863 A * | 3/2002 | | B60N 2/42 |
| JP | 2002145003 A * | 5/2002 | | B60R 21/22 |
| JP | 2002350250 A * | 12/2002 | | G01L 1/20 |
| JP | 2008-94235 A | 4/2008 | | |
| JP | 2008-105446 A | 5/2008 | | |
| JP | 2009-132245 A | 6/2009 | | |
| JP | 2009-149285 A | 7/2009 | | |
| WO | 2004/069586 A1 | 8/2004 | | |
| WO | 2006/003749 A1 | 1/2006 | | |
| WO | WO 2007049537 A1 * | 5/2007 | | B60R 21/207 |

* cited by examiner

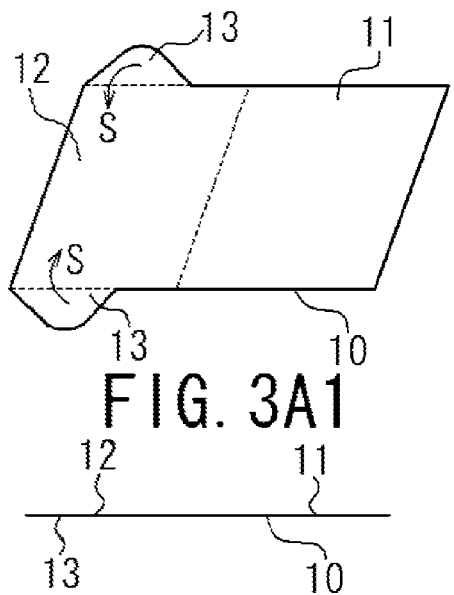
FIG. 3A1
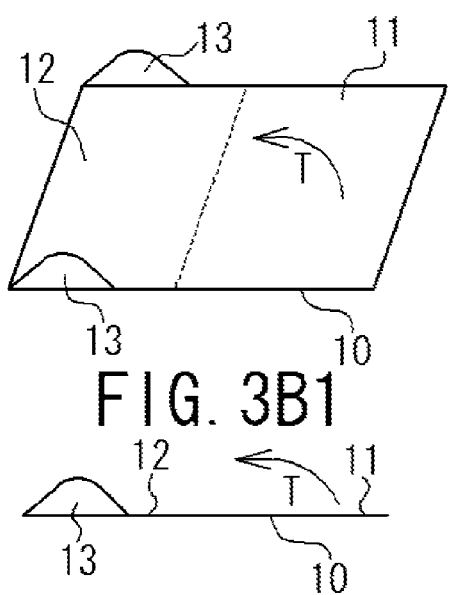
FIG. 3B1
FIG. 3A2
FIG. 3B2
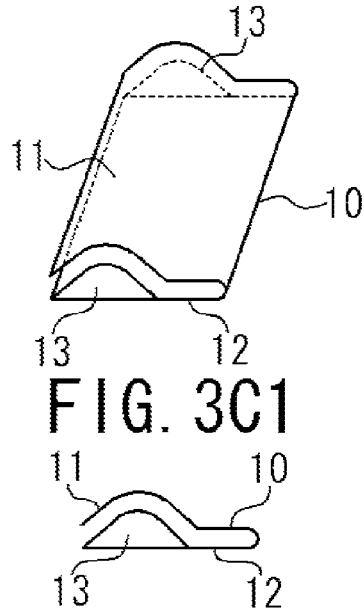
FIG. 3C1
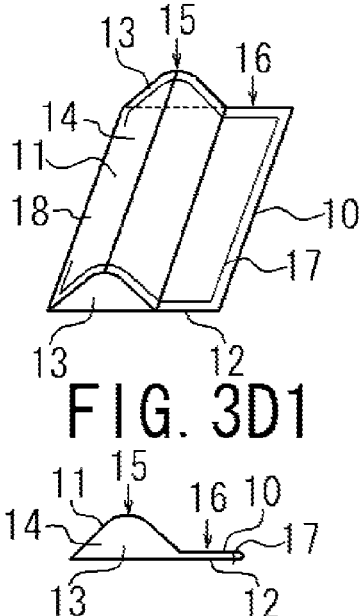
FIG. 3D1
FIG. 3C2
FIG. 3D2
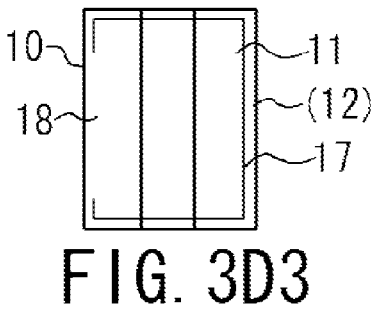
FIG. 3D3

AIRBAG DEVICE

CROSS REFERENCE TO RELATED APPLICATIONS

This application is a National Stage of International Application No. PCT/JP2011/060735 filed May 10, 2011, claiming priority based on Japanese Patent Application No. 2010-112130 filed May 14, 2010, the contents of all of which are incorporated herein by reference in their entirety.

TECHNICAL FIELD

The present invention relates to an airbag device for protecting an occupant seated in a seat by inflating an airbag inside a seating portion of a vehicle's seat.

BACKGROUND ART

In order to protect an occupant in an emergency or a collision of a vehicle, an airbag device (seat-in bag device) installed inside a seat is used. The airbag device includes an airbag disposed inside a seating portion of a seat. The airbag is inflated under the occupant and restrains the occupant who is wearing a seatbelt to the seat. The airbag device prevents a submarine phenomenon that usually occurs to the occupant when an impact is applied to the vehicle from the front. The submarine phenomenon is a phenomenon in which the lumbar of an occupant slips through a lap belt of a seatbelt and moves forward off the lap belt.

To counter the phenomenon, an occupant protecting device having an enhanced function to suppress forward movement of the lumbar is known (see PTL 1).

In an existing occupant protecting device, a front inflation portion of an airbag is inflated to a high position, under knees of an occupant. By doing so, the knees of the occupant are pushed above thighs, whereby the forward movement of the lumbar is suppressed.

However, in such an occupant protecting device, the airbag is formed by stacking base fabric pieces constituting upper and lower surfaces on top of each other and joining them. Therefore, the airbag in an undeployed state has a flat shape, and the airbag tends to be inflated uniformly over the entirety thereof. Furthermore, because the volume of the front inflation portion is limited, the height to which the knees are pushed up may be influenced. Depending on the state of the seat (such as the strength of a seat pad and the angle of a seating surface), it may be impossible to push up the knees high enough. In addition, because the shape and height of this airbag, in an inflated state, cannot be designed freely, the design flexibility is low. As a result, it is difficult to appropriately inflate the airbag so as to flexibly conform to a change of the state of the seat or the restraining conditions of the occupant. Thus, from the standpoint of improving the occupant protection function, further improvement of occupant protecting devices has been required so that forward movement of the lumbar can be more reliably suppressed.

CITATION LIST

Patent Literature

PTL 1: Japanese Unexamined Patent Application Publication No. 2009-149285

SUMMARY OF INVENTION

Technical Problem

The present invention has been made in view of the above-described problem occurring with the existing devices, and an object thereof is, in an airbag inflatable inside a seating portion of a vehicle's seat, to increase the design flexibility, in terms of shape and height, of the airbag in an inflated state. Another object is to push up knees of a seated occupant with an airbag and to more reliably suppress forward movement of the lumbar.

Solution to Problem

The present invention is an airbag device including an airbag that is disposed inside a seating portion of a vehicle's seat and is inflatable under a seated occupant; and an inflator that generates gas to inflate and deploy the airbag. The airbag includes an upper base fabric piece, a lower base fabric piece, and a pair of side base fabric pieces that are joined to one another and form an air chamber therein. The pair of side base fabric pieces are disposed at part of side portions between the upper base fabric piece and the lower base fabric piece and define the shape of the inflated air chamber.

Advantageous Effects of Invention

According to the present invention, in an airbag inflatable inside a seating portion of a vehicle's seat, the design flexibility, in terms of shape and height, of the airbag in an inflated state can be increased. Furthermore, knees of a seated occupant can be pushed up with an airbag, and forward movement of the lumbar can be more reliably suppressed.

BRIEF DESCRIPTION OF DRAWINGS

FIG. 3 includes diagrams showing a process of producing the airbag according to this embodiment.

DESCRIPTION OF EMBODIMENTS

An embodiment of an airbag device of the present invention will be described below with reference to the drawings.

The airbag device according to this embodiment is a seat-in bag device that can be installed in a vehicles' seat (hereinbelow, a "seat") of any type. The airbag device causes an airbag to be inflated and deployed inside a seating portion of a seat, thereby protecting an occupant seated in the seat with the airbag.

Figure 1:
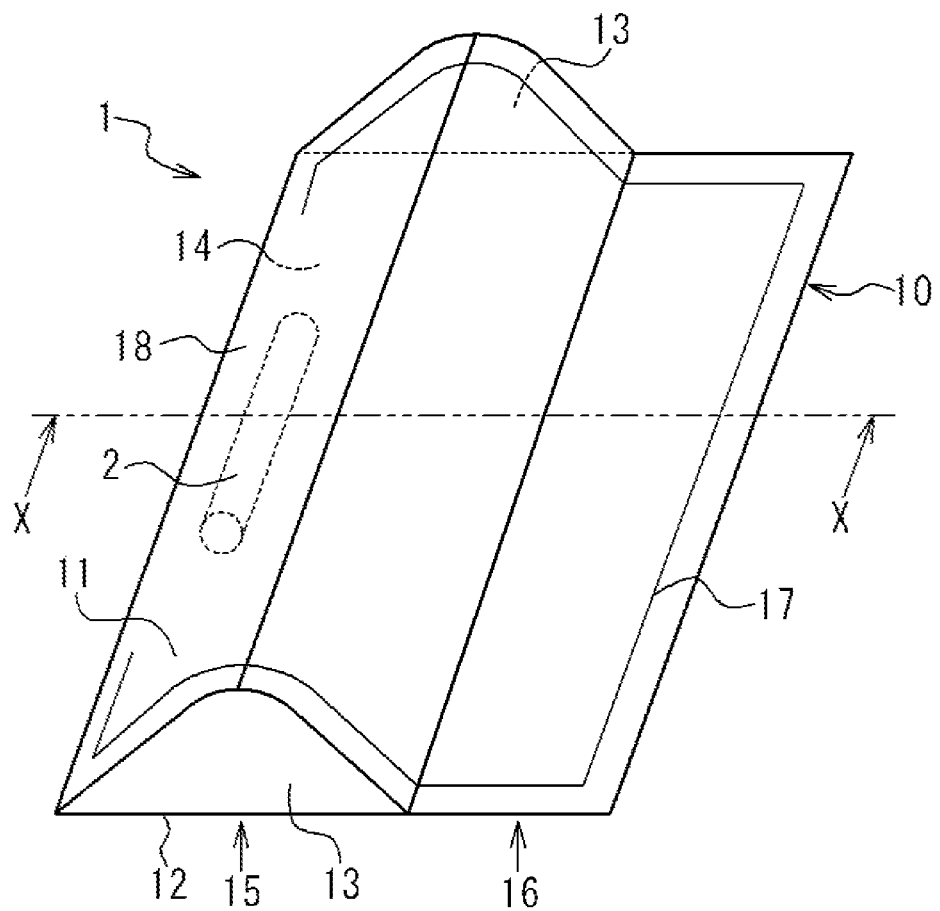
FIG. 1 is a perspective view showing the schematic configuration of an airbag device according to this embodiment.
Figure 2:
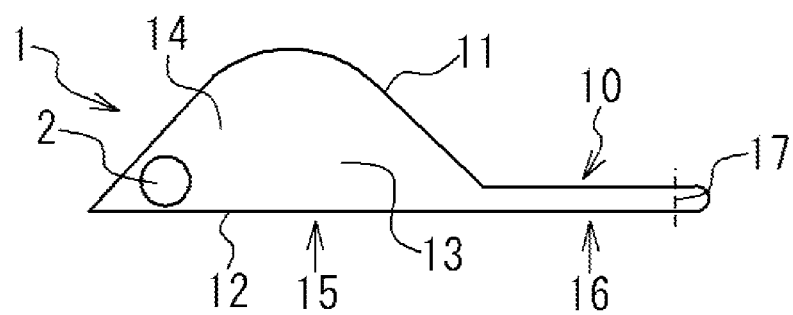
FIG. 2 is a cross-sectional view of the airbag device shown in FIG. 1, taken along line X-X.

FIG. 1 is a perspective view showing the schematic configuration of an airbag device 1 according to this embodiment. FIG. 1 shows an airbag 10 viewed from above at an angle. Furthermore, the internal configuration of the airbag 10 is illustrated by a dashed line. FIG. 2 is a cross-sectional view of the airbag device 1 shown in FIG. 1, taken along line X-X.

Note that FIGS. 1 and 2 show the airbag 10 before being inflated or installed in the seat. Furthermore, FIGS. 1 and 2 show the airbag 10 placed on a flat surface. In FIGS. 1 and 2 (and other figures), the upper side and the lower side correspond to the upper side and the lower side of the vehicle, and the left side and the right side correspond to the front side and the rear side of the vehicle. In the present invention, the front side and the rear side of the vehicle is simply referred to as the front side and the rear side, and the front-rear direction of the vehicle is simply referred to as the front-rear direction.

As shown in the figures, the airbag device 1 includes the airbag 10 that can be inflated and deployed, and an inflator 2. The inflator 2 is a columnar cylinder-type gas generating device and is disposed inside the airbag 10. The inflator 2 generates gas in an emergency of the vehicle or when an impact is detected and supplies gas to the airbag 10. Due to the gas, the airbag 10 is inflated and deployed from a predetermined folded shape. The inflator 2, which is stored at the front side in the airbag 10, is disposed in the vehicle's width direction. The inflator 2 has a plurality of gas discharge ports (not shown) at one end in the longitudinal direction. The inflator 2 generates gas inside the airbag 10 by radially discharging gas from the plurality of gas discharge ports.

The airbag 10 is a rectangular bag in top view and is disposed inside the seating portion of the seat, with the inflator 2 being stored therein. The airbag 10 is inflated with the gas generated by the inflator 2, under the occupant seated in the seat. Furthermore, the airbag 10 includes an upper base fabric piece 11, a lower base fabric piece 12, and a pair of side base fabric pieces 13. The base fabric pieces 11, 12, and 13 are joined to one another so as to form an inflatable air chamber 14 therein. The upper base fabric piece 11 is a rectangular fabric-like component and is disposed on a seat's surface side (occupant side). The upper base fabric piece 11 constitutes the top surface of the airbag 10. The lower base fabric piece 12 is a rectangular fabric-like component having the same shape as the upper base fabric piece 11 in top view. The lower base fabric piece 12 is disposed on a seat's bottom side so as to face the upper base fabric piece 11. The lower base fabric piece 12 constitutes the lower surface of the airbag 10.

The pair of side base fabric pieces 13 are disposed at part of side portions between the upper base fabric piece 11 and the lower base fabric piece 12 and form part of the side portions. The pair of side base fabric pieces 13 allow part of the airbag 10 to be inflated in a thickness direction, in the shape of the side base fabric pieces 13. The pair of side base fabric pieces 13 restrict the height to which the respective parts of the air chamber 14 (airbag 10) are inflated. Furthermore, the pair of side base fabric pieces 13 define the shape of the air chamber 14 and the airbag 10 in an inflated state. The pair of side base fabric pieces 13 allow the airbag 10 to be inflated in a predetermined shape in side view and to a predetermined thickness (the distance between the upper base fabric piece 11 and the lower base fabric piece 12). In the airbag 10, a portion where the side base fabric pieces 13 are provided is inflated to a larger thickness (higher) than a portion where the side base fabric pieces 13 are not provided. The pair of side base fabric pieces 13 allow the airbag 10 to be inflated and deployed partially to a higher position.

The side base fabric pieces 13 are formed of triangular fabric-like components. Portions of the side base fabric pieces 13 on the upper base fabric piece 11 side (upper edges) each have inclined portions extending forward and rearward from an apex defined therebetween. Furthermore, the upper edges of the side base fabric pieces 13 are inclined at a steeper angle on the front side than on the rear side. That is, the upper edges of the side base fabric pieces 13 are inclined in the opposite directions, i.e., toward the front side and the rear side, from the apexes. The angle of the upper edges is greater on the front side than on the rear side. The angle of the upper edges is the angle of the upper edges of the side base fabric pieces 13 with respect to a line in the front-rear direction. The pair of side base fabric pieces 13 are disposed at the side portions between the upper base fabric piece 11 and the lower base fabric piece 12, on the front side thereof. Furthermore, the pair of side base fabric pieces 13 are provided so as to protrude upward from the flat lower base fabric piece 12. As a result, the upper base fabric piece 11 is raised upward in areas where the side base fabric pieces 13 are disposed. The upper base fabric piece 11 has a three-dimensional configuration and is bent at the apexes of the side base fabric pieces 13. Portions of the upper base fabric piece 11 located on both sides of the apexes of the side base fabric pieces 13 constitute inclined surfaces inclined in opposite directions. In areas where the side base fabric pieces 13 are not provided, the upper base fabric piece 11 is laid on top of the lower base fabric piece 12.

On the front side of the airbag 10, a standing portion (three-dimensional portion) 15 is formed of the base fabric pieces 11, 12, and 13. The standing portion 15 is formed of the upper base fabric piece 11, the lower base fabric piece 12, and the side base fabric pieces 13 and is formed in a triangular shape in side view. Furthermore, the standing portion 15 is formed in the shape of a triangular column extending in the vehicle's width direction. On the rear side of the airbag 10, a flat portion 16 is formed of the upper base fabric piece 11 and the lower base fabric piece 12 into a rectangular shape in top view. Inner spaces of the standing portion 15 and flat portion 16 communicate with each other inside the airbag 10, forming the air chamber 14. When the airbag 10, installed in the seat, is inflated under the occupant, the standing portion 15 and the flat portion 16 are inflated into different shapes on the front side and rear side inside the seating portion. When the airbag 10 is inflated under a properly seated occupant, the standing portion 15 is inflated to a large size (a large thickness) so as to stand up in front of thigh bones. The flat portion 16 is inflated to a small size (a small thickness) behind the thigh bones.

The standing portion 15 and the flat portion 16 are formed in a front side area and a rear side area, respectively, of the airbag 10, corresponding to positions where they should be inflated. The side base fabric pieces 13 are formed in the shape corresponding to the shape of the standing portion 15 in an inflated state and are disposed on the sides of the airbag 10, corresponding to the area where the standing portion 15 is formed. The airbag 10 is formed of base fabric pieces formed by cutting, for example, a resin-coated cloth. The material is cut into one or more base fabric pieces, and these base fabric pieces are assembled to form the airbag 10. By sewing or bonding the base fabric pieces together in an air-tight manner, the inflatable air chamber 14 is formed between the base fabric pieces. Thus, the airbag 10 is formed in the shape of a bag.

FIG. 3 includes diagrams showing a process of producing the airbag 10. FIGS. 3A to 3D show, in sequence, the production steps of the airbag 10. FIGS. 3A1 to 3D1 are perspective views corresponding to FIG. 1. FIGS. 3A2 to 3D2 are cross-sectional views corresponding to FIG. 2. FIG. 3D3 is a plan view of FIG. 3D1.

As shown in the airbag 10 of this embodiment, the upper base fabric piece 11, the lower base fabric piece 12, and the pair of side base fabric pieces 13 are formed of a single base fabric piece. After one or a plurality of integrally formed base fabric pieces are stacked, the base fabric pieces are folded at predetermined positions and sewn. Thus, the airbag 10 is produced.

More specifically, the base fabric pieces of the airbag (see FIG. 3A) include a rectangular portion constituting the upper base fabric piece 11 and the lower base fabric piece 12, and a pair of triangular pieces constituting the pair of side base fabric pieces 13. The pair of triangular pieces are formed at one end of side edges of the rectangular portion. The pair of side base fabric pieces 13 are formed integrally on the side edges of the upper base fabric piece 11 or integrally on the side edges of the lower base fabric piece 12 (herein, the lower base fabric piece 12). When producing the airbag 10, first, a single base fabric piece is laid on a table, and the pair of side base fabric pieces 13 are folded upward (arrows S in FIG. 3A1). Next, the upper base fabric piece 11 (see FIG. 3B) is folded back to overlie the lower base fabric piece 12 (an arrow T in FIG. 3B). The upper base fabric piece 11 is disposed to overlie the lower base fabric piece 12 and the edges of the pair of side base fabric pieces 13 (see FIG. 3C).

Then, the upper base fabric piece 11 and the lower base fabric piece 12 (see FIG. 3D) are joined along an outer edge joint portion 17. Furthermore, the upper base fabric piece 11 and the side base fabric pieces 13 are joined along the outer edge joint portion 17. The base fabric pieces 11, 12, and 13 are joined along the outer edge joint portion 17, forming the air chamber 14 between the base fabric pieces 11, 12, and 13. Thus, the airbag 10 including the standing portion 15 and the flat portion 16 is produced. The outer edge joint portion 17 is a joint portion that divides the inside and outside of the airbag 10 and defines the shape of the air chamber 14. The outer edge joint portion 17 is provided along the outer edge of the air chamber 14. The base fabric pieces 11, 12, and 13 stacked on top of each other are sewn together with one or more seams along the outer edge joint portion 17. The edges of the upper base fabric piece 11 and lower base fabric piece 12 are partially left unjoined at a position between the pair of side base fabric pieces 13 to provide an opening 18 on the front side of the airbag 10. The inflator 2 (see FIGS. 1 and 2) is inserted from the opening 18 and is disposed at a predetermined position inside the air chamber 14 (herein, in the standing portion 15). Then, the airbag 10, at the portion having the opening 18, is folded to close the portion having the opening 18. In this state, the airbag 10, together with the inflator 2, is disposed inside the seating portion of the seat and is fixed to the seating portion with a fixing member.

Figure 4:
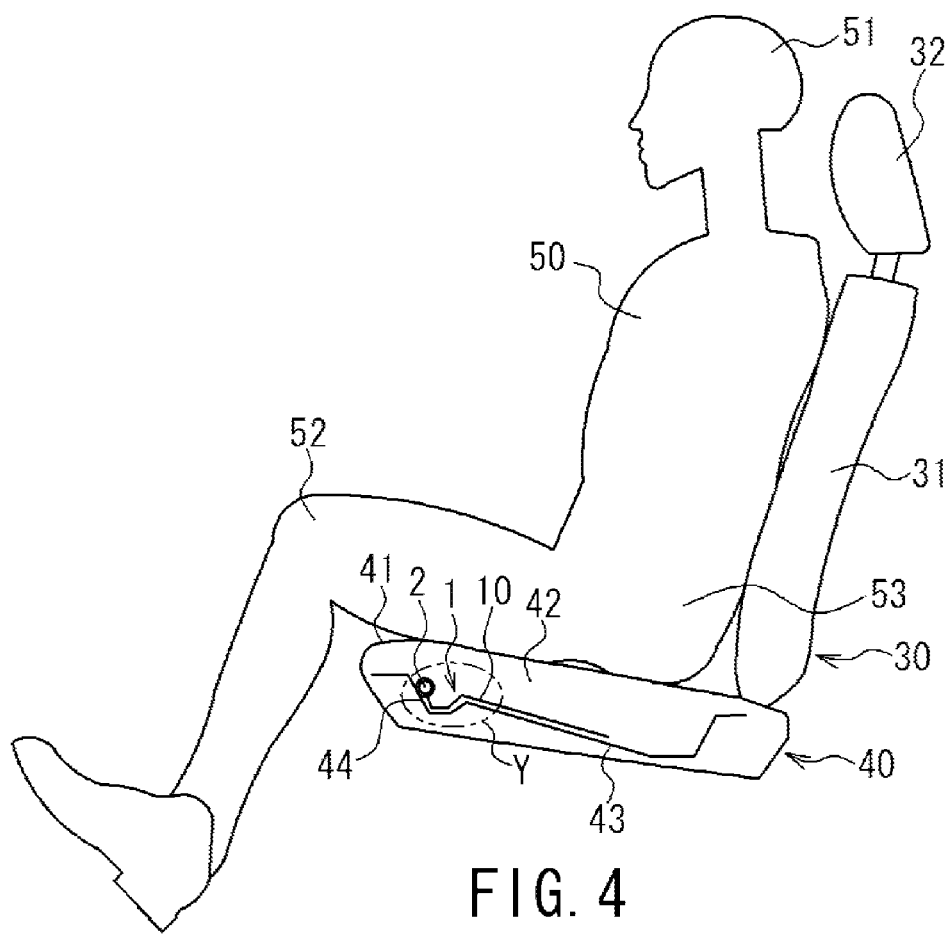
FIG. 4 is a cross-sectional view showing a seat in which the airbag device is installed in a seating portion.

FIG. 4 is a cross-sectional view showing a seat in which the airbag device 1 is installed in the seating portion. FIG. 4 also schematically shows a seated occupant 50.

A seat 30 is a typical passenger car seat. As shown, the seat 30 includes a seating portion (seat cushion) 40, a seat back 31, and a headrest 32. The occupant 50 is seated on the seating portion 40. The seat back 31 is positioned behind the occupant 50. The headrest 32 supports a head 51 of the occupant 50. The seating portion 40 includes a cover 41 for covering the surface, a seat pad (cushion) 42, and a seat pan 43. The seat pad 42 is, inside the cover 41, disposed over the entire area under the occupant 50. The seat pan 43 supports the seat pad 42 from below. On the front side of the seat pan 43, a recessed accommodating portion 44 is formed. The accommodating portion 44 accommodates part of the airbag device 1. The airbag device 1 is disposed inside the accommodating portion 44 and in an area behind the accommodating portion 44.

The airbag 10, with the inflator 2 stored therein, is disposed on the top surface of the seat pan 43. The inflator 2 is fixed to a fixing portion provided in the accommodating portion 44 with a fixing member (not shown). By doing so, the inflator 2 and the front end of the airbag 10 are attached to the inside of the accommodating portion 44. The airbag 10 is laid flat on the top surface of the seat pan 43. The rear end of the airbag 10 is fixed to the seat pan 43 with a fixing member (not shown), such as a plastic clip. By doing so, the airbag 10 in an unfolded state is attached to the seat pan 43. The airbag 10 is disposed in a predetermined area inside the seating portion 40, beneath the seated occupant 50. Furthermore, the airbag 10 is folded into a predetermined shape such that the upper base fabric piece 11 and the lower base fabric piece 12 make an intimate contact. The airbag 10 is disposed between the seat pan 43 and the seat pad 42.

Figures 5A, 5B:
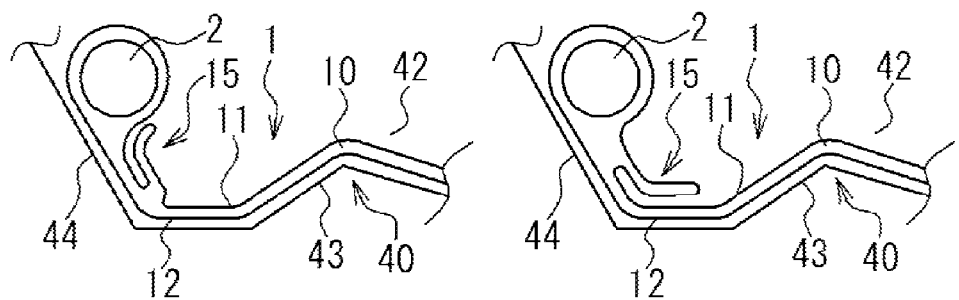
FIG. 5 includes cross-sectional views showing part of the airbag inside the seating portion.

FIG. 5 includes cross-sectional views showing part of the airbag 10 inside the seating portion 40. In FIG. 5, a portion of the airbag 10 near the accommodating portion 44 (area Y in FIG. 4) is schematically shown in an enlarged manner.

As shown in the figure, inside the seating portion 40, the upper base fabric piece 11 of the airbag 10 is disposed on the lower base fabric piece 12 on the seat pan 43. Furthermore, the excess portion of the upper base fabric piece 11 (standing portion 15) is folded. The excess portion of the upper base fabric piece 11 is a portion between the pair of side base fabric pieces 13. The excess portion of the upper base fabric piece 11 is folded toward the front side (see FIG. 5A) or the rear side (see FIG. 5B) in a flat shape. In this manner, the upper base fabric piece 11 and the lower base fabric piece 12 are stacked on top of each other, and the portion between the pair of side base fabric pieces 13 is folded forward or rearward. In this state, the airbag 10 is disposed inside the seating portion 40.

The airbag device 1, after being installed in a vehicle, activates the inflator 2 in an emergency of the vehicle. The inflator 2 generates gas and supplies the gas into the air chamber 14 in the airbag 10. With the gas, the airbag 10 is gradually inflated in the seating portion 40 while being unfolded. The airbag 10 is inflated and deployed upward from the seat pan 43.

Figure 6:
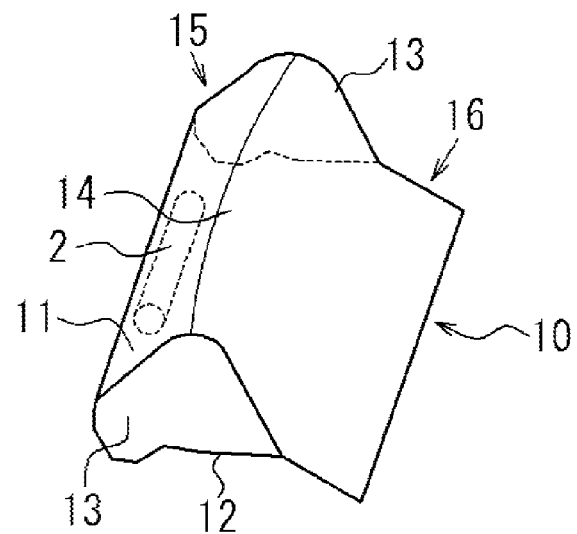
FIG. 6 is a perspective view schematically showing the airbag after being inflated and deployed.

FIG. 6 is a perspective view schematically showing the airbag 10 after being inflated and deployed.

By supplying the gas to the airbag 10, as shown in the figure, the upper base fabric piece 11 and the lower base fabric piece 12 are separated, and the air chamber 14 is inflated. When the airbag 10 is to be inflated, first, gas is supplied to the standing portion 15 accommodating the inflator 2. The standing portion 15 starts to be inflated with the gas. Then, the gas is supplied from the standing portion 15 to the flat portion 16, inflating the entire standing portion 15 and flat portion 16. After being inflated, the distance between the upper base fabric piece 11 and the lower base fabric piece 12 is larger at the standing portion 15, where the pair of side base fabric pieces 13 are provided, than at the flat portion 16, where the base fabric pieces 11 and 12 are directly joined together. The airbag 10 is inflated in the shape of the side base fabric pieces 13. The front side portion (standing portion 15) of the airbag 10, where the pair of side base fabric pieces 13 are provided, is inflated to a larger height than the rear side portion (flat portion 16). The standing portion 15 stands upright. The airbag 10 is inflated in the shape of the pair of side base fabric pieces 13, such that the apexes of the side base fabric pieces 13 are the highest. Furthermore, the airbag 10 is inflated in such a manner that the thickness gradually increases from the rear side toward the front side and is inflated and deployed in a triangular shape in side view.

Figure 7:
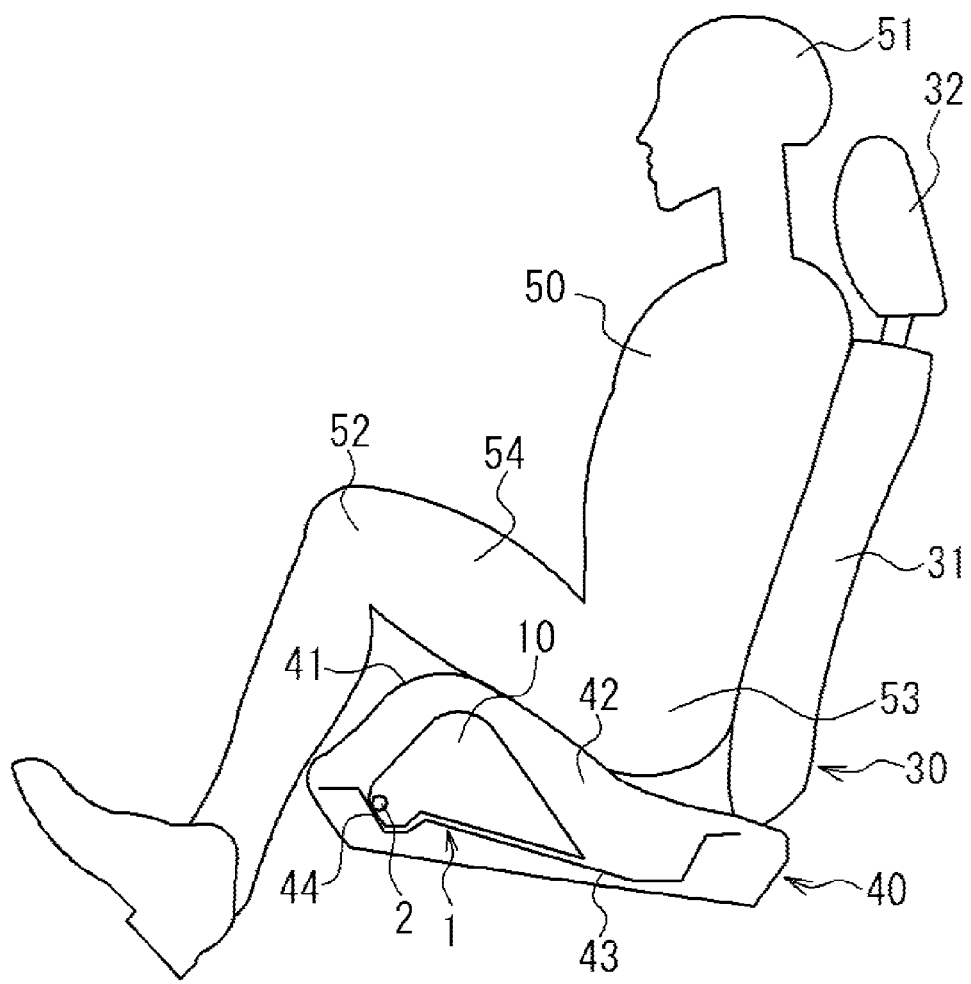
FIG. 7 is a cross-sectional view showing the seat when the airbag has been inflated and deployed.

FIG. 7 is a cross-sectional view showing the seat 30 when the airbag 10 has been inflated and deployed. FIG. 7 also schematically shows the seated occupant 50.

As shown, the airbag 10 is inflated and deployed upward from the seat pan 43, inside the seating portion 40 on which the occupant 50 is seated. The airbag 10 pushes up the seat pad 42. The seat pad 42 is deformed in the shape of the inflated airbag 10 and is bent at the position where the airbag 10 is the highest. The airbag 10 pushes up the seat pad 42 to a higher position on the front side and to a lower position on the rear side. The seat pad 42 is pushed up by the airbag 10 to a higher position on the side of knees 52 of the seated occupant 50 and to a lower position on the side of a lumbar 53. The airbag 10 continuously changes the height to which the seat pad 42 is pushed up, thereby uplifting the seating surface of the seating portion 40 beneath the occupant 50.

In accordance with this, the knees 52 of the occupant 50 are pushed up to a position higher than the lumbar 53. The lumbar 53 is squeezed into a corner between the seat back 31 and the seating portion 40. At the same time, the lumbar 53 is pushed backward and is pressed against the seat back 31. As a result, the forward movement of the lumbar 53 is prevented. Furthermore, when an impact is applied to the vehicle from the front side, the lap belt of the seatbelt is prevented from coming off from the lumbar 53. Thus, the submarine phenomenon is prevented. In other words, the occupant 50 is prevented from slipping through the lap belt. At the same time, because the occupant 50 who is moving forward is subjected to a reaction force from the airbag 10, the movement of the occupant 50 is prevented. The inflated airbag 10 restrains the pelvis of the occupant 50 and retains the pelvis that is moving forward. Therefore, the forward movement of the lumbar 53 is more reliably suppressed. In this manner, the seated occupant 50 is restrained to the seat 30 and is protected by the airbag 10 in an inflated and deployed state.

In the above-described airbag device 1, the pair of side base fabric pieces 13 are disposed at part of the side portions of the upper base fabric piece 11 and the lower base fabric piece 12. Because the shape of the inflated air chamber 14 can be defined by the side base fabric pieces 13, the airbag 10 can be inflated and deployed in any shape designed. Furthermore, by changing the shape and position of the pair of side base fabric pieces 13, the airbag 10 can be inflated in any state inside the seating portion 40. It is also possible to increase the design flexibility, in terms of shape and height, of the airbag 10 in an inflated state. Thus, the airbag 10 can be appropriately inflated while flexibly responding to changes of the state of the seat 30, in which the airbag 10 is installed, and the restraining conditions of the occupant 50. Furthermore, the respective parts of the airbag 10 can be inflated according to the function and object of these parts. For example, by increasing the volume of a portion of the airbag 10 that pushes up the knees 52 of the occupant 50, the knees 52 can be pushed up to a sufficiently high position.

As has been described above, the airbag device 1 according to this embodiment can appropriately inflate and deploy the airbag 10, regardless of the state of the seat 30 (such as the strength of the seat pad 42 and the angle of the seating surface). Furthermore, the knees 52 of the seated occupant 50 can be pushed up, and forward movement of the lumbar 53 can be more reliably suppressed. As a result, it is possible to reliably restrain the occupant 50 to the seat 30 by the airbag 10. It is possible to increase the protection function of the airbag device 1 for the seated occupant 50. By disposing the pair of side base fabric pieces 13 on the front side of the side portions between the upper base fabric piece 11 and the lower base fabric piece 12, the knees 52 of the occupant 50 can be pushed up to a relatively high position. By doing so, the forward movement of the lumbar 53 and the submarine phenomenon can be more reliably prevented. If the portions of the pair of side base fabric pieces 13 on the upper base fabric piece 11 side are formed in such a shape that the inclination on the front side is steeper than that on the rear side, the airbag 10 can be inflated so as to conform to the inclination of the thighs 54 of the occupant 50 (see FIG. 7). Furthermore, owing to the seating surface of the seating portion 40 that is deformed so as to be inclined, the thighs 54 of the occupant 50 can be pushed up so as to be inclined without a strong force. Thus, the lumbar 53 can be smoothly and reliably restrained.

Herein, the airbag 10 may be formed of separately formed base fabric pieces 11, 12, and 13. The base fabric pieces 11, 12, and 13 are assembled and joined. Note that, by forming the pair of side base fabric pieces 13 integrally with the side edges of the upper base fabric piece 11 or the lower base fabric piece 12, the number of joints between the base fabric pieces 11, 12, and 13 can be reduced. Therefore, the production efficiency of the airbag 10 can be improved. The pair of side base fabric pieces 13 may be formed integrally with the side edges of the upper base fabric piece 11, instead of the side edges of the lower base fabric piece 12. If the base fabric pieces 11, 12, and 13 are formed of a single base fabric piece, the step of joining the base fabric pieces 11, 12, and 13 can be omitted at bending portions of the base fabric piece. Accordingly, the production efficiency of the airbag 10 can be further improved.

When the airbag 10, in which the upper base fabric piece 11 and the lower base fabric piece 12 are stacked on top of each other, is disposed inside the seating portion 40, the portion between the pair of side base fabric pieces 13 is desirably folded forward or rearward. By doing so, the airbag 10 can be smoothly inflated so as to stand upright, at the portion where the pair of side base fabric pieces 13 are provided, i.e., the portion to be inflated to a high position. Furthermore, the knees 52 of the occupant 50 can be quickly pushed up.

Note that an inner member may be provided in the air chamber 14 of the airbag 10. Examples of the inner member include a diffuser and an inner bag.

Figure 8A:
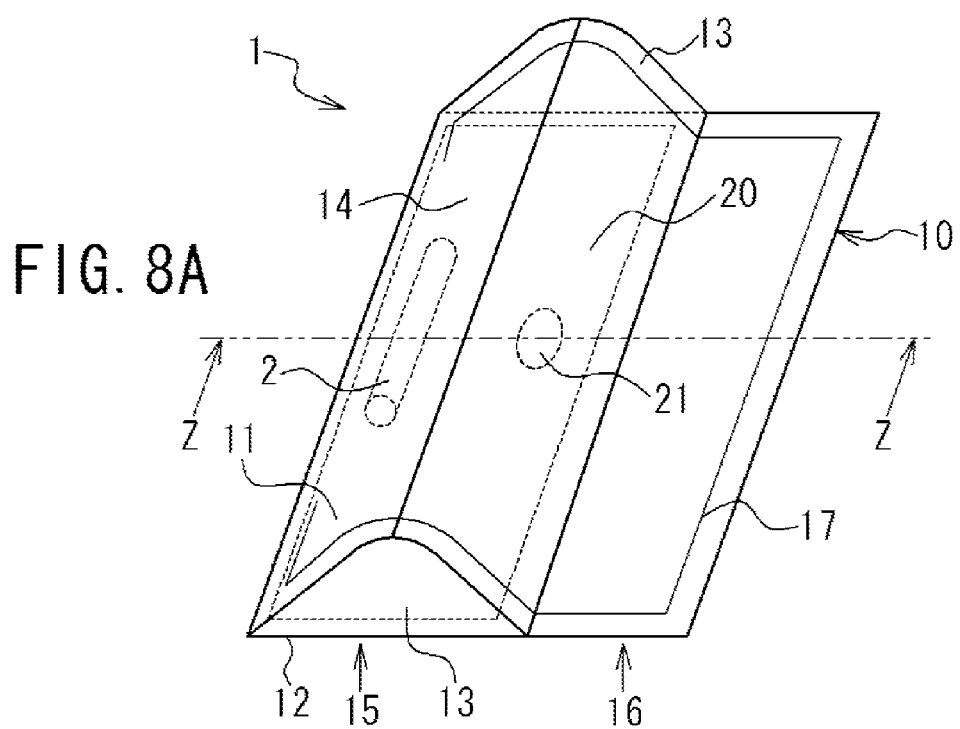
FIG. 8 includes diagrams showing an airbag having a diffuser therein.
Figure 8B:
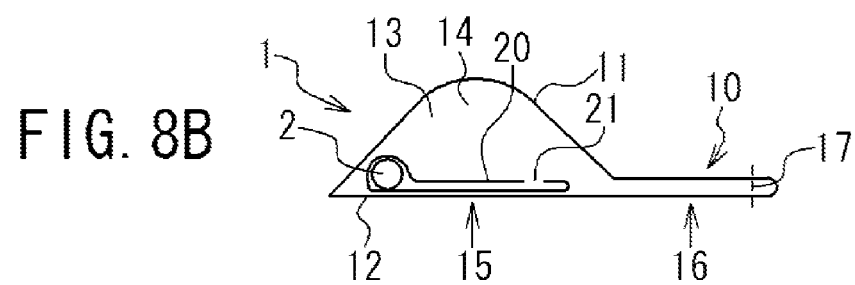
Figure 8C:
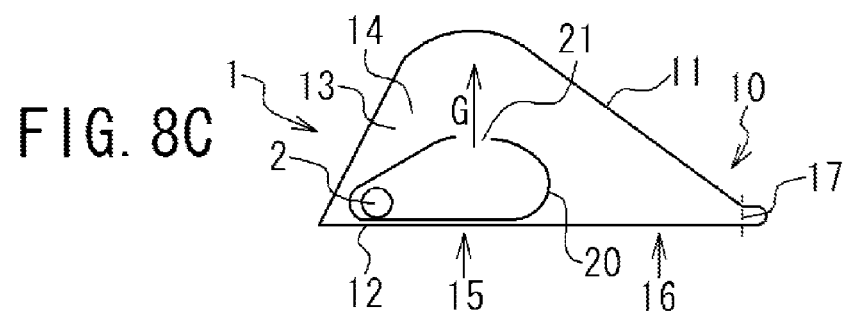

FIG. 8 includes diagrams showing the airbag 10 having a diffuser therein. FIG. 8A is a perspective view of the airbag 10 before being inflated. FIG. 8B is a cross-sectional view taken along line Z-Z in FIG. 8A. FIG. 8C is a cross-sectional view of the inflated airbag 10.

Herein, as shown in the figure, the airbag 10 has a diffuser 20 inside the air chamber 14. The diffuser 20, in a folded state, is disposed in the standing portion 15. The diffuser 20 is formed of, for example, a rectangular base fabric piece in a bag shape. The base fabric piece is folded into half and is joined along the side edges. The diffuser 20, with the inflator 2 accommodated therein, is disposed inside the airbag 10, at a portion between the pair of side base fabric pieces 13. The diffuser 20 is a rectifying cloth that rectifies gas generated by the inflator 2. The diffuser 20 rectifies the gas and supplies the gas to a portion of the airbag 10 that is intended to be inflated to a large size. The diffuser 20 has an opening 21 through which the gas is released upward.

The diffuser 20 is inflated inside the airbag 10 by the gas generated by the inflator 2 therein. Furthermore, the diffuser 20 releases the gas generated by the inflator 2 from the opening 21 in the top surface. Thus, the diffuser 20 rectifies the gas in the air chamber 14 between the pair of side base fabric pieces 13 (arrow G in FIG. 8C) and directs the gas upward. As the diffuser 20 is inflated, the portion between the pair of side base fabric pieces 13 (standing portion 15) is initially inflated in the airbag 10. Furthermore, due to the gas rectified by the diffuser 20, the standing portion 15 is quickly and precisely inflated upward. By providing the diffuser 20 as in this case, the inflation characteristics of the airbag 10 can be improved.

In addition, it is possible to quickly and reliably restrain the occupant 50 to the seat 30 by the airbag 10. Accordingly, the above-described advantages of the airbag 10 can be further increased.

REFERENCE SIGNS LIST

1: airbag device,
2: inflator,
10: airbag,
11: upper base fabric piece,
12: lower base fabric piece,
13: side base fabric piece,
14: air chamber,
15: standing portion,
16: flat portion,
17: outer edge joint portion,
18: opening,
20: diffuser,
21: opening,
30: seat,
31: seat back,
32: headrest,
40: seating portion,
41: cover,
42: seat pad,
43: seat pan,
44: accommodating portion,
50: occupant,
51: head,
52: knee,
53: lumbar, and
54: thigh.

The invention claimed is:

1. An airbag device comprising:
   an airbag that is disposed inside a seating portion of a vehicle's seat and is inflatable under a seated occupant; and
   an inflator that generates gas to inflate and deploy the airbag,
   wherein the airbag includes an upper base fabric piece, a lower base fabric piece, and a pair of side base fabric pieces that are joined to one another and form an air chamber therein,
   wherein the pair of side base fabric pieces are disposed at part of side portions between the upper base fabric piece and the lower base fabric piece and define the shape of an inflated air chamber, and
   wherein the airbag, in a state in which the upper base fabric piece and the lower base fabric piece are stacked on top of each other and in which a portion between the pair of side base fabric piece is folded forward or rearward, is disposed in the seating portion.

2. The airbag device according to claim 1, wherein the pair of side base fabric pieces are disposed on a front side of the side portions between the upper base fabric piece and the lower base fabric piece.

3. The airbag device according to claim 1, wherein the pair of side base fabric pieces are formed integrally with side edges of the upper base fabric piece or side edges of lower base fabric piece.

4. The airbag device according to claim 1, wherein the upper base fabric piece, the lower base fabric piece, and the pair of side base fabric pieces are formed of a single base fabric piece.

5. The airbag device according to claim 1, wherein portions of the pair of side base fabric pieces on the upper base fabric piece each have inclined portions extending forward and rearward from an apex defined therebetween, the inclined portion extending forward being inclined at a steeper angle than that extending rearward.

6. The airbag device according to claim 1, further comprising a diffuser that rectifies gas generated by the inflator in an air chamber provided between the pair of side base fabric piece and directs the gas upward.

* * * * *